United States Patent [19]

Hassler

[11] Patent Number: 4,493,216

[45] Date of Patent: Jan. 15, 1985

[54] METHOD AND APPARATUS FOR CONDUCTING FLOW MEASUREMENTS ON FLOWING MEDIA ACCORDING TO THE ULTRASONIC DOPPLER METHOD

[75] Inventor: Dieter Hassler, Uttenreuth, Fed. Rep. of Germany

[73] Assignee: Siemens Aktiengesellschaft, Berlin & Munich, Fed. Rep. of Germany

[21] Appl. No.: 426,617

[22] Filed: Sep. 29, 1982

[30] Foreign Application Priority Data

Nov. 27, 1981 [DE] Fed. Rep. of Germany ....... 3147197

[51] Int. Cl.$^3$ ................................. G01F 1/66
[52] U.S. Cl. .................. 73/861.25; 128/663
[58] Field of Search ....................... 73/861.25; 128/663

[56] References Cited

U.S. PATENT DOCUMENTS

| | | |
|---|---|---|
| 3,675,192 | 7/1972 | Fahrbach . |
| 3,766,517 | 10/1973 | Fahrbach . |
| 3,974,692 | 8/1976 | Hassler . |
| 3,977,247 | 8/1976 | Hassler . |
| 4,067,236 | 1/1978 | Hottinger .................. 73/861.25 |
| 4,095,597 | 6/1978 | Hassler .................. 73/861.25 X |
| 4,127,842 | 11/1978 | Hassler . |

FOREIGN PATENT DOCUMENTS 1812017  7/1970  Fed. Rep. of Germany .

OTHER PUBLICATIONS

Hottinger et al. "An Ultrasonic Technique for Unambiguous Measurement of Blood Volume Flow" Ultrasonic Symposium Proceedings, IEEE Cat. No. 74 CHO 896-1SU, 1974, pp. 667-670.

Primary Examiner—Charles A. Ruehl
Attorney, Agent, or Firm—Hill, Van Santen, Steadman & Simpson

[57] ABSTRACT

Due to a different configuration of the ultrasonic beam as well as different signal gate adjustments, two different doppler signal collection regions ($V_{m1}$, $V_p$) of the flowing medium are selectable. To further develop the state of the art, without excessively increased technical outlay, at least the flow velocity ($\bar{v}$) and/or the flow cross-sectional area (F) are to be measured, preferably simultaneously with the volume flow (Q), independently of the irradiation angle of the ultrasound into the flowing medium. This is achieved through selection of a third doppler signal collection region ($V_{m2}$), power measurements ($P_{m1}$, $P_p$, $P_{m2}$) from all three regions ($V_{m1}$, $V_p$, $V_{m2}$) and the calculation from the powers together with additional known parameters of the signal collection regions such that, with cancellation of the angle-dependency, the respectively desired flow quantity (F, $\bar{v}$, Q) directly results. A preferred implementation is for the purpose of diagnosis of blood flow.

12 Claims, 2 Drawing Figures

METHOD AND APPARATUS FOR CONDUCTING FLOW MEASUREMENTS ON FLOWING MEDIA ACCORDING TO THE ULTRASONIC DOPPLER METHOD

BACKGROUND OF THE INVENTION

The invention relates to a method for conducting flow measurements on flowing media according to the ultrasonic Doppler method. It likewise relates to an apparatus for carrying out such a method.

With the ultrasonic Doppler method, as is known, flow measurements can be conducted in such a fashion that, in the end result, one obtains the flow velocity, the flow cross section, or the volume flow. The volume flow Q of flowing media in the case of a randomly chosen velocity profile, as is known, is given by the relationship $Q = F \cdot v$, where F represents the cross-sectional area of the flow and $\bar{v}$ represents a mean value of the velocity of flow.

The mean value $\bar{v}$ can be ascertained according to an ultrasonic Doppler method such as is described e.g. in the U.S. Pat. No. 3,675,192. The cross-sectional area can likewise be measured according to the ultrasonic Doppler method, for example, according to the manner of the German AS No. 18 12 017, indirectly via the ascertainment of a vessel radius. Other measurement possibilities beyond the ultrasonic Doppler method are likewise applicable. All known methods for the determination of the flow velocity $\bar{v}$ and the cross-sectional area F, aside from the fact that some methods (in particular, according to German AS No. 18 12 017) are relatively imprecise and therefore subject to measurement errors, have the disadvantage of dependency on the irradiation angle of the ultrasound into the flowing medium. This problem could be confronted up to the present time only, at least as far as the measurement of the flow velocity is concerned, in that either the angle was explicitly measured with additional technical outlay (e.g. U.S. Pat. Nos. 3,974,692 or 4,127,842) or, by means of a two-beam intersection measurement (e.g. according to the U.S. Pat. No. 3,766,517), the angle was eliminated. However, an angle-independent cross-sectional measurement could thus still not yet be conducted.

As far as the volume flow Q is concerned, the latter can, of course, be ascertained in an angle-independent fashion according to such a Doppler method as is described e.g. in the article "An Ultrasonic Technique for Unambiguous Measurement of Blood Volume Flow" by C. F. Hottinger and J. D. Meindl in the Journal "Ultrasonics Symposium Proceedings", IEEE Cat. No. 74 CHO 896-1SU, 1974. According to this method, the volume flow Q results according the equation:

$$Q = (\bar{v} \cdot \cos \alpha) \cdot \frac{V_p}{d} \cdot \frac{P_{m1}}{P_p} \qquad (1)$$

whereby $P_{m1}$ represents the measured power of the Doppler signals from a first Doppler signal collecting region with the volume $V_{m1}$ and the thickness d, and $P_p$ represents the measured Doppler signal power from a second Doppler signal collecting region with the volume $V_p$. The flow velocity $\bar{v}$ is, indeed, associated with the cosine of the irradiation angle $\alpha$ of the ultrasound into the flowing medium. Since the quantity $\bar{v} \cdot \cos \alpha$, however, is directly measured as a velocity component in the sound propagation direction, one finds the volume flow Q without additional angular measurement. A similar method for the measurement of the volume flow Q according to the ultrasonic Doppler method is described in U.S. Pat. No. 3,977,247. Here the volume flow Q results independently of the irradiation angle of the ultrasound into the flowing medium during measurement on flow vessels running in a curved fashion since, in such an instance, the measurement arrangement can be so adjusted that the irradiation angle relative to the flow direction is virtually zero. However, in the case of any other irradiation angle the volume flow results solely according to the relation:

$$Q = (\bar{v} \cdot \sin \alpha) \cdot \frac{V_p}{b} \cdot \frac{P_{m2}}{P_p} \qquad (2)$$

where $P_p$ again represents the power of the Doppler signals from the second Doppler signal collecting region with the volume $V_p$, and $P_{m2}$ represents the power of Doppler signals which originate from a third Doppler signal collecting region with the width b.

According to the method of the article of C. F. Hottinger and J. D. Meindl, as well as according to the exceptional case of the U.S. Pat. No. 3,977,247, the volume flow can, indeed, be directly, angle-independently measured; however, if one simultaneously also wishes to ascertain the flow velocity $\bar{v}$ and/or the flow cross-section F, then, even in the case of the method of the article of C. F. Hottinger and J. D. Meindl, an angle-dependent measurement must be conducted, since the blood flow velocity, or the cross-sectional area of the flow, respectively, are dependent upon the irradiation angle $\alpha$ according to a cosine relation. Regarding the general case of the U.S. Pat. No. 3,977,247, it has already been mentioned that the measurement of the volume flow Q is only possible when simultaneously also the flow velocity $\bar{v}$ in combination with $\sin \alpha$ is measured.

SUMMARY OF THE INVENTION

It is the object of the invention to disclose such method from the ultrasonic Doppler technology in which, without an excessively great increased technical outlay, at least the flow velocity and/or the flow cross-sectional area, and possibly simultaneously also the volume flow, can be measured completely independently of the irradiation angle of the ultrasound into the flowing medium.

Proceeding from a method of the initially cited type, the object is achieved in accordance with the invention through the following steps:

(a) selecting by means of different first and second ultrasonic beam configurations and by means of first and second signal gate adjustments, respectively, first and second Doppler signal collection regions of a flowing medium, which signal collecting regions differ in perimeter, the first signal collecting region being dependent upon the incident angle of the first ultrasonic beam configuration;

(b) measuring the powers ($P_{m1}$, $P_p$) of the Doppler signals arriving from the first and second signal collection regions, (c) selecting by means of a third ultrasonic beam configuration and by means of a third signal gate adjustment, a third Doppler signal collection region of the flowing medium, which third signal collection region, compared with the first signal collection region, is dependent in a complementary fashion upon said incident angle, (d) measuring the power ($P_{m2}$) of the Doppler signal arriving from the third signal collection region, and (e) relating the powers ($P_{m1}$, $P_p$, $P_{m2}$), resulting from steps (b) and (d), and known parameters of the signal collection regions with one another in such a fashion that with cancellation of the angle-dependency, the flow cross-sectional area (F) and/or the flow velocity ($\bar{v}$) directly results.

An apparatus for carrying out this inventive method is characterized by an ultrasonic Doppler applicator which generates first and second ultrasonic beam configurations with different perimeters, power measuring means for the detection of the powers ($P_{m1}$, $P_p$) of the Doppler signals which arrive from a first signal collection region and a second signal collection region, selection means for the selection of a third Doppler signal collection region disposed in a complementary fashion to the incident angle of the first ultrasonic beam configuration, an additional power measuring means which detects the power ($P_{m2}$) of the Doppler signals arriving from the third signal collection region, and computer means which, from the resulting powers ($P_{m1}$, $P_p$, $P_{m2}$) and from system parameters, pursuant to cancellation of the angle-dependency, directly calculates the flow cross-sectional area (F) and/or the flow velocity ($\bar{v}$).

The invention advantageously combines the two measurement methods known from the article of C. F. Hottinger and J. D. Meindl as well as from the U.S. Pat. No. 3,977,247, in such a manner that, through corresponding linkage of the powers ensuing from both methods, an angle-independent measurement of the flow cross-sectional area F and/or of the flow velocity $\bar{v}$ results. If one assumes that the steps (a) and (b) are a part of the method which originates from C. F. Hottinger and J. D. Meindl, then from (b), given a corresponding ratio formation, additionally the volume flow Q can be angle-independently measured according to the relation (1). Thus, $\bar{v}$ and F, as well as Q, can then be simultaneously detected in an angle-independent fashion. The steps (a) and (b) are thus steps of the method of C. F. Hottinger and J. D. Menidl. The steps (c) and (d) are, by contrast, steps of the method which is disclosed in U.S. Pat. No. 3,977,247. The surprising and considerable advantage of the invention, however, does not reside solely in the combination of the steps (a) and (b) of the one method with the steps (c) and (d) of the other method; on the contrary, it results only on the basis of such a combination pursuant to the addition of the step (e), as a consequence of which the angle-independent determination also additionally of the flow velocity and/or the flow cross-sectional area is first rendered possible.

Thus, in an advantageous embodiment of the invention, the first Doppler signal collecting region is, due to the definition of the irradiation angle with respect to the flow direction, dependent upon the cosine of the irradiation angle, whereas the third Doppler signal collecting region is dependent upon the sine of the irradiation angle, so that the first and third Doppler signal collecting regions depend on said irradiation angle in a complementary fashion. From the obtained powers, as well as the known values of all signal collecting regions (i.e., also those of the common second signal collecting region), the flow cross-sectional area F can then be ascertained, utilizing the Pythagorean theorem, such that the flow cross-sectional area F results according to the following equation:

$$F = \frac{\frac{V_p}{P_p}}{\sqrt{\left(\frac{d}{P_{m1}}\right)^2 + \left(\frac{b}{P_{m2}}\right)^2}} \quad (3)$$

The flow velocity $\bar{v}$ results in the simplest fashion according to the relation $\bar{v}=Q/F$, in that, for Q, the equation (1) is employed, and, for F, the equation (3) is employed. The relationship then results for the flow velocity:

$$\bar{v} = \frac{P_{m1}}{d} \sqrt{\left(\frac{d}{P_{m1}}\right)^2 + \left(\frac{b}{P_{m2}}\right)^2} \cdot (\bar{v} \cos \alpha) \quad (4)$$

Since $\bar{v} \cos \alpha$ again only represents the direct measurable velocity component in the sound direction, one obtains the flow velocity $\bar{v}$ directly angle-independently merely through measurement of the two Doppler signal powers $P_{m1}$ and $P_{m2}$ from the first and from the third Doppler signal collecting region.

Further advantages and details of the invention are apparent from the following description of an exemplary embodiment of the basis of the accompanying drawing sheet; and other objects, features and advantages will be apparent from this detailed disclosure and from the appended claims.

DETAILED DESCRIPTION

Figure 1:
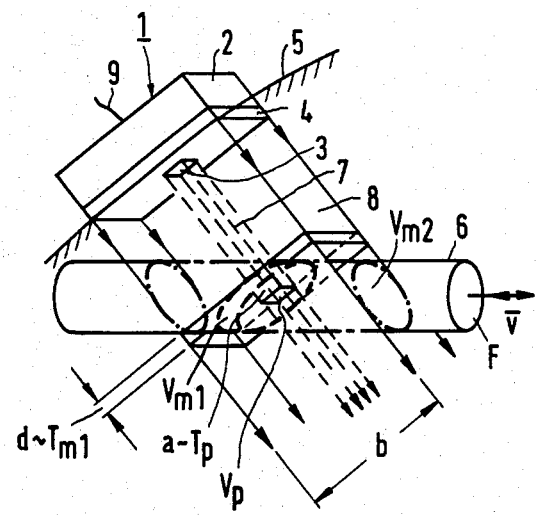
FIG. 1 illustrates the invention in the basic method of operation.

FIG. 1 shows an ultrasonic Doppler applicator 1, such as is basically also described in the article of C. F. Hottinger and J. D. Meindl, and in the U.S. Pat. No. 3,977,247. The applicator 1 accordingly comprises a support part, e.g. of plastic, on the application surface of which a smaller central ultrasonic transducer 3 as well as a larger-surface ultrasonic transducer 4, which surrounds the smaller central ultrasonic transducer 3, are arranged. The applicator 1 rests on the body surface 5 of a patient on which blood flow measurements, for example, on the illustrated blood vein 6, are to be conducted. The blood vein 6 has the cross-sectional area F. The mean flow velocity of the blood in the vein is represented with $\bar{v}$.

The smaller central ultrasonic transducer 3 of the applicator 1 generates a narrow first ultrasonic beam 7 which is designated in the following as the calibration beam. Both ultrasonic transducers, i.e. the smaller central ultrasonic transducer 3 and the larger-area exterior ultrasonic transducer 4, surrounding the latter, together generate, on the other hand, a second ultrasonic beam 8, which is thicker relative to the calibration beam, which ultrasonic beam 8 shall be designated in the following as the primary beam. As shall yet be explained in greater detail on the basis of the basic circuit diagram of FIG. 2, the processing circuit for the Doppler signals, which are received by the ultrasonic Doppler applicator 1, contains three electronic time gates, by means of the gate times of which the signal reception can be adjusted to three specially selected depth regions in the examined subject. According to FIG. 2, the gate opening time $T_p$ applies, for example, to the calibration beam 7 of the central ultrasonic transducer 3. In conjunction with $T_p$, as well as the exterior circumference of the calibration beam, thus there is excised by the calibration beam 7, in the known fashion and as illustrated in FIG. 1, a sample volume $V_p$ disposed within the blood flow which is referred to herein as the second signal collection region. The gate times $T_{m1}$ and $T_{m2}$, by contrast, apply to the primary beam 8. $T_{m1}$ is here so selected, according to the article of C. F. Hottinger and J. D. Meindl, that, in combination with the exterior circumference of the primary beam 8, the measurement volume $V_{m1}$ of a first Doppler signal collection region of the blood vein 6, illustrated by dash lines in FIG. 1, results. The gate time $T_{m2}$, which is adjusted according to the teaching of the U.S. Pat. No. 3,977,247, by contrast, leads, in conjunction with the exterior dimensions of the primary beam 8, to a measurement volume $V_{m2}$ of the blood vein 6 such as is illustrated in dash-dot lines in FIG. 1. The measurement volume $V_{m1}$ thus corresponds to the volume of the first Doppler signal collecting region, and the measurement volume $V_{m2}$ corresponds to the volume of the third Doppler signal collecting region. $P_p$, $P_{m1}$, and $P_{m2}$ are the powers which the Doppler signals have which are received from the volumes $V_p$, $V_{m1}$, and $V_{m2}$, respectively. The dimensions b and d are again the additional values of the individual volumes already described above, as well as indicated in FIG. 1. The thickness d of the measurement volume $V_{m1}$ in the sonic beam direction is to preferably correspond to the dimension a of the sample volume $V_p$ in the sonic beam direction, i.e. $T_{m1}$ and $T_p$ are selected such that $T_{m1}=T_p$. Both dimensions d and a can, however, also be different. The gate time $T_{m2}$ can lie between a minimum value, which merely ensures that the tubular volume $V_{m2}$ is not cut in the sonic direction, and infinity.

Thus, according to the measurement method of the article of C. F. Hottinger and J. D. Meindl, the volume flow Q, taking into consideration the power $P_{m1}$, thus results according to the initially mentioned equation (1). According to the measurement method of the U.S. Pat. No. 3,977,247, by contrast, one obtains, taking into consideration the power $P_{m2}$, the volume flow Q according to the relation (2) likewise already explained at the outset. If, taking into consideration the relation $F=Q/\bar{v}$, a solution is effected from equation (1) for the area F, one obtains the relation:

$$F = \cos \alpha \cdot \frac{V_p}{d} \cdot \frac{P_{m1}}{P_p} \quad (5)$$

For the equation (2) there correspondingly results $$F = \sin \alpha \cdot \frac{V_p}{b} \cdot \frac{P_{m2}}{P_p} \quad (6)$$

Pursuant to application of the Pythagorean theorem, both equations for the area can be combined with one another as follows:

$$F^2 \left[ \left( \frac{P_p}{P_{m1}} \cdot \frac{d}{V_p} \right)^2 + \left( \frac{P_p}{P_{m2}} \cdot \frac{b}{V_p} \right)^2 \right] = 1 \quad (7)$$

From equation (7) one then obtains the cross-sectional area F of the blood vein according to the relation (3) already cited initially. This relation for the area is independent of the angle of incidence $\alpha$. It now only still comprises the Doppler signal powers $P_p$, $P_{m1}$, and $P_{m2}$, to be measured, from the three different signal collecting regions. The system quantities b, d, and $V_p$ are known. Thus, it is possible, as desired, for the cross-sectional area F to be measured exclusively by means of Doppler technique, independently of its chance shape and angular position (or attitude) and its possibly pulsation-conditioned change as a function of time, in contrast with the measurement method of the German AS No. 18 12 017 which always stipulates, for functioning, nonpathological circular vessel cross-sections.

The mean flow velocity $\bar{v}$ is obtained from the relation $\bar{v}=Q/F$ through insertion of the equations (1) and (3) in the form of the initially stated equation (4).

Figure 2:
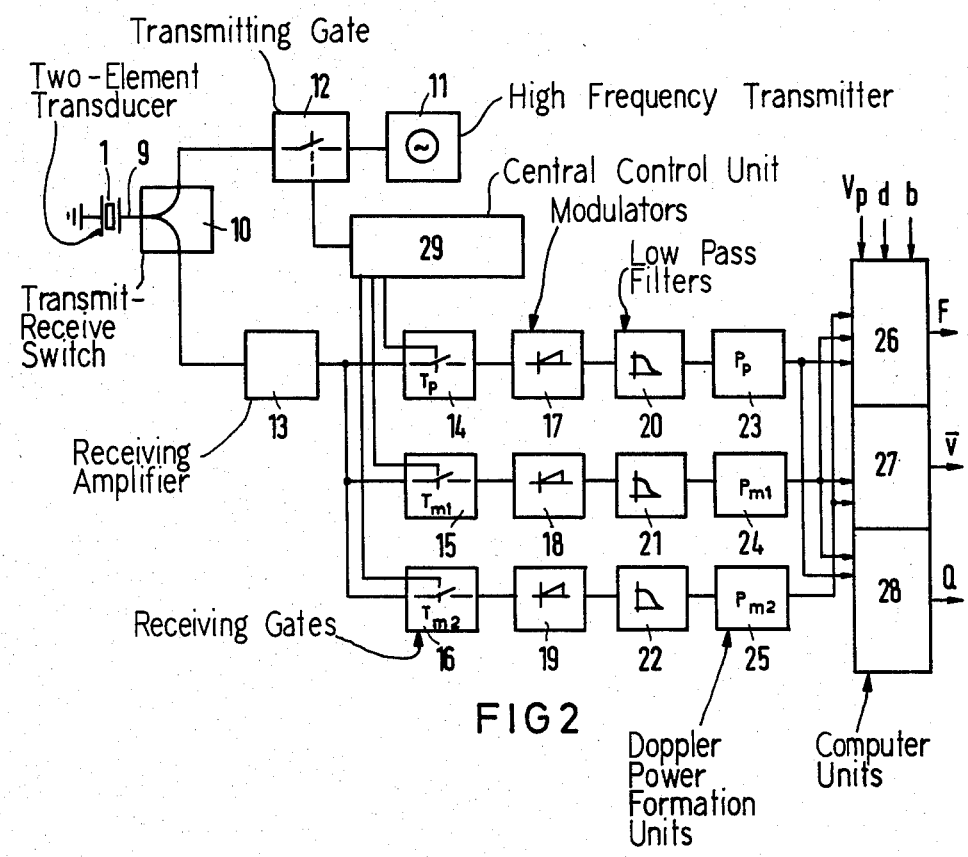
FIG. 2 illustrates a basic circuit diagram for carrying out the inventive measuring method.

In the basic circuit diagram of FIG. 2, the ultrasonic Doppler applicator is connected via the transmission- and receiving-line 9 with a signal switch 10. Via this signal switch 10 there are supplied to the transducers 3 and 4 of the applicator 1, for the purpose of their excitation in the transmit mode, high frequency transmit pulses of a high frequency transmitter 11 with a series connected transmitting gate 12. The ultrasonic echo signals, arriving from the body interior, are received by the Doppler applicator 1 and, in the form of reconverted electric signals, are again supplied via the switch 10 to a receiving amplifier 13. From there the electric echo signals reach the three receiving gates 14, 15, 16, already mentioned in the preceding, with the gate times $T_p$, $T_{m1}$, and $T_{m2}$, respectively. These gates allow only signals from the desired three signal collecting regions $V_p$, $V_{m1}$, and $V_{m2}$ to pass through. These signals allowed to pass through reach modulators 17, 18, 19, with output low pass filters 20, 21, 22, where, through demodulation, in conventional fashion, the low-frequency Doppler signals are obtained. These low-frequency Doppler signals then proceed for the purpose of power measurement, to power formation units 23, 24, and 25. The arriving powers, $P_p$, $P_{m1}$, and $P_{m2}$ are transmitted in the illustrated fashion to computer units 26, 27, and 28. The computer unit 26 calculates according to equation (3) the flow cross-sectional area F of the vein 6; the computer unit 27 calculates according to equation (4) the mean flow velocity $\bar{v}$ of the blood in the vein; and the computer unit 28 calculates the volume flow Q independently of the irradiation angle. The block 29 is a central control device.

It will be apparent that many modifications and variations may be made without departing from the scope of the teachings and concepts of the present invention.

I claim as my invention:

1. Method for conducting flow measurements on flowing media, in particular, blood in blood vessels, according to the ultrasonic Doppler method, said method comprising:

(a) selecting by means of different first and second ultrasonic beam configurations and by means of first and second signal gate adjustments, respectively, first and second Doppler signal collection regions of a flowing medium, which signal collection regions differ in perimeter, the first signal collection region being dependent upon the incident angle of the first ultrasonic beam configuration, (b) measuring the powers ($P_{m1}$ and $P_p$), of the Doppler signals arriving from the first and second signal collection regions, (c) selecting by means of a third ultrasonic beam configuration and by means of a third signal gate adjustment, a third Doppler signal collection region of said flowing medium, which third signal collection region, compared with the first signal collection region, is dependent in a complementary fashion upon said incident angle, (d) measuring the power ($P_{m2}$) of the Doppler signals originating from the third signal collection region, and (e) relating the powers ($P_{m1}$, $P_p$ and $P_{m2}$) resulting from steps (b) and (d), and known parameters of the signal collection regions with one another in such a fashion that, with cancellation of the angle-dependency, the flow cross-sectional area and/or the flow velocity directly results.

2. Method according to claim 1, wherein the first Doppler signal collection region is dependent upon the cosine of the incident angle, whereas the third Doppler signal collection region is dependent upon the sine of the incident angle, said method comprising the step of determining from the obtained powers and the known parameters of the signal collection region, the flow cross-sectional area (F) pursuant to ultilization of the Pythagorean theorem.

3. Method according to claim 2, comprising the steps of determining the flow cross-sectional area (F) according to the equation $$F = \frac{\frac{V_p}{P_p}}{\sqrt{\left(\frac{d}{P_{m1}}\right)^2 + \left(\frac{b}{P_{m2}}\right)^2}}$$

where $V_p$ represents the volume of the second signal collection region, where $P_p$ represents the power of the Doppler signals arriving from this second region, where $P_{m1}$ represents the power of the Doppler signals arriving from the first signal collection region, where $P_{m2}$ represents the power of the Doppler signals arriving from the third signal collection region, where d represents the dimension of the first signal collection region in the direction of the first ultrasonic beam configuration, and where b represents a dimension of the third signal collection region transverse to the direction of the third ultrasonic beam configuration.

4. Method according to claim 1, comprising the step of determining the mean flow velocity $\bar{v}$ from the measured powers and from the system parameters according to the relation $$\bar{v} = \frac{P_{m1}}{d} \sqrt{\left(\frac{d}{P_{m1}}\right)^2 + \left(\frac{b}{P_{m2}}\right)^2} \cdot (\bar{v} \cos \alpha)$$

where $P_{m1}$ represents the power of the Doppler signals arriving from the first signal collection region, where $P_{m2}$ represents the power of the Doppler signals arriving from the third signal collection region, where d represents the dimension of the first signal collection region in the direction of the first ultrasonic beam configuration, and where b represents a dimension of the third signal collection region transverse to the direction of the third ultrasonic beam configuration.

5. Apparatus for carrying out the method according to claim 1, comprising: an ultrasonic Doppler applicator which generates said first and second ultrasonic beam configurations with different perimeters, power measuring means for the detection of the powers ($P_{m1}$, $P_p$) of the Doppler signals which arrive from the first signal collection region and the second signal collection region, selection means for the selection of the third Doppler signal collection region, an additional power measuring means which detects the power ($P_{m2}$) of the Doppler signals arriving from the third signal collection region, and computer means which, from the resulting powers ($P_p$, $P_{m1}$, $P_{m2}$) and from the system parameters, pursuant to cancellation of the angle-dependency, directly calculates the flow cross-sectional area (F) and/or the flow velocity ($\bar{v}$).

6. Apparatus according to claim 5, with said selection means selecting the volume ($V_{m2}$) of the third signal collection region and comprising a receiving gate whose gate time ($T_{m2}$) has at least a minimum value which ensures that the volume ($V_{m2}$) in the direction of the third ultrasonic beam configuration is not less than the complete volume of the flowing medium which is intercepted by the third ultrasonic beam configuration.

7. Apparatus according to claim 5, comprising electronic receiving gate means for selecting the extent of the volume ($V_{m1}$) of the first signal collection region and of the volume ($V_p$) of the second signal collection region in the ultrasonic beam direction, said electronic receiving gate means having correspondingly preselectable gate times ($T_{m1}$, $T_p$).

8. Apparatus according to claim 7, wherein, for the first and second signal collection regions, the gate times ($T_{m1}$, $T_p$) of the associated electronic receiving gate means are selected to be equal so that said first and second signal collection regions, in the irradiation direction of the first and second ultrasonic beam configuration, exhibit the same thickness (d).

9. Apparatus according to claim 5, wherein said computer means comprises a first, second and third computer unit connected with the power measuring means, the first computer unit calculating the flow cross sectional area according to the equation $$F = \frac{V_p/P_p}{\sqrt{\left(\frac{d}{P_{m1}}\right)^2 + \left(\frac{b}{P_{m2}}\right)^2}}.$$

10. Apparatus according to claim 9, wherein the second computer unit calculates the flow velocity ($\bar{v}$) according to the equation $$\bar{v} = \frac{P_{m1}}{d} \sqrt{\left(\frac{d}{P_{m1}}\right)^2 + \left(\frac{b}{P_{m2}}\right)^2} \cdot (\bar{v} \cos \alpha).$$

11. Apparatus according to claim 9, wherein the third computer unit calculates the volume flow (Q) according to the relation $$Q = (\bar{v} \cos \alpha) \cdot \frac{V_p}{d} \cdot \frac{P_{m1}}{P_p};$$

where $\bar{v}\cdot\cos \alpha$ is the directly measured velocity component.

12. Apparatus according to claim 5, wherein the ultrasonic Doppler applicator comprises a smaller central ultrasonic transducer and a larger ultrasonic transducer which surrounds the smaller central ultrasonic transducer, wherein the smaller central ultrasonic transducer has a perimeter for determining the perimeter of the volume of the second signal collection region, and wherein the perimeter of the larger ultrasonic transducer, with the inclusion of the central ultrasonic transducer, determines the perimeter of the volumes of the first and of the third signal collection regions.

* * * * *